Oct. 26, 1926.

J. P. H. KROON 1,604,920

DEVICE FOR TENSIONING A TRAP

Filed July 30, 1924

INVENTOR
Jacobus P. H. Kroon
BY
ATTORNEYS

Patented Oct. 26, 1926.

1,604,920

UNITED STATES PATENT OFFICE.

JACOBUS PIET HENRI KROON, OF AMSTERDAM, NETHERLANDS.

DEVICE FOR TENSIONING A TRAP.

Application filed July 30, 1924, Serial No. 729,147, and in the Netherlands August 20, 1923.

The invention relates to a device for tensioning a trap of the known kind in which said tensioning is effected by moving a spring controlled striking bar under the rear end of a slipping lever which is retained near the axis of rotation of the striking bar by a slipping member.

The purpose of the invention is to construct the striking bar in such a manner that the slipping lever automatically locks the striking bar when this bar is tensioned by hand.

According to the invention the slipping lever comprises a portion bent parallel to the axis of rotation of the striking bar and rotatably mounted at two points in such a manner that one of the attaching members permits the bent portion to also move in a vertical plane. The slipping lever has at the side of the other attaching member a lengthening hook-shaped piece the first portion of which is bent upwards and the end portion of which is bent forward. The striking bar has a U shaped curved portion parallel to the axis of rotation of the bar, which curved portion is situated with regard to the end portion of the slipping lever in such a manner that on tensioning the striking bar the convex side of the curved portion pushes this end portion of the lever aside after which the slipping lever returns into its original position as soon as the curved portion has passed said end portion so that this end portion enters into the concave side of the curved portion and prevents the striking bar from turning backwards after same has been released.

The device will be described with the aid of the accompanying drawing.

Figure 1:
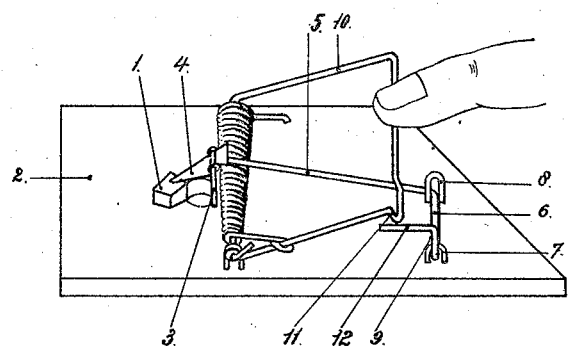
Fig. 1 is a diagrammatical view of an embodiment in a position during the tensioning of the striking bar in which the U-shaped curved position of the bar just touches the end portion of the slipping lever.

The striking bar 10 is rotatably fixed on a base plate 2. The bar is controlled in the usual manner by a spiral spring wound about the axis of the said bar. In front of the spring is fixed a staple 3 on the horizontal portion of which a double flap 4 is rotatably arranged. The slipping lever 5, which is made of iron wire, is bent in different directions and has a portion which runs parallel to the axis of rotation of the striking bar. This portion 6 is rotatably mounted in two eyes 7 and 8 attached at the rear part of the base plate. The eye 8 is formed in such a manner that it permits the portion 6 of the slipping lever to move also in a vertical plane. The slipping lever has at the side of the eye 7 a projection 9—12, which, immediately next to the eye, runs upwards at 9 and thereafter forward at 12. The striking bar 10 comprises at the side of the eye 7 a U-shaped curved portion 11 parallel to the axis of rotation of the bar in such a direction that when the striking bar 10 is tensioned completely the outer end 12 of the slipping lever may engage in the convex side of the U-shaped curved portion.

Figure 2:
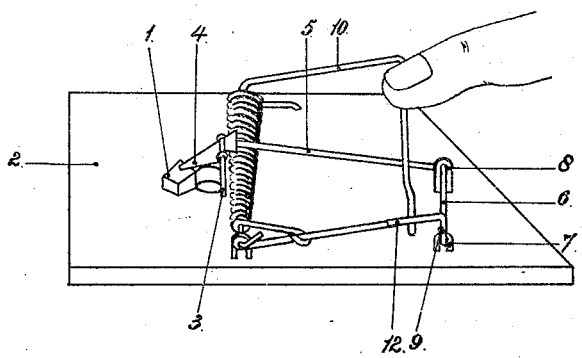
Fig. 2 shows the trap in a position in which the striking bar is moved a little further so that the end portion of the slipping lever is forced aside by the U shaped curved portion of the striking bar and is just in a position to fall backwards in its original position as soon as the striking bar is still moved further.

In order to tension the trap the following is done:

A piece of bait 1 is put under the front arm of the flap 4 taking care that the forward outer end of the slipping lever 5 extends below the rear arm of the flap 4. Thereafter the striking bar 10 is turned to the rear so that the U-shaped curved portion 11 with its convex side pushes the slipping lever 5 aside (see Fig. 2) whereas as soon as the left portion of the striking bar has passed the outer end 12 of the slipping lever said lever returns into its original position so that the end portion 12 of the slipping lever enters into the concave side of the curve 11 the striking bar thus being prevented by the slipping lever from turning back after said bar has been released because of the bait laying under the front part of the flap 4.

What I claim is:

1. A device for tensioning traps of the kind in which, when the trap is set, a spring controlled striking bar engages under the free forwardly bent leg of the U-shaped slipping lever which is retained near to the axis of rotation of the striking bar by a slipping member, whilst the bridge portion of the U-shaped end of the slipping lever forms a shaft for said lever, characterized in that one of the members in which the bridge portion of the slipping lever is rotatable permits said portion to perform a tilting movement, the striking bar having a curved portion which on tensioning the trap, pushes aside the free forwardly bent hook-shaped leg of the slipping lever which thereby performs a tilting movement until the curved portion has passed beyond the hook, after which the slipping lever will return into its original position in which the hook engages the curved portion and prevents the striking bar from striking backwards.

2. A trap, comprising a base, a U-shaped spring actuated striking member mounted on the base, a slipping lever bent into U-shape with its members of unequal length and lying in different horizontal planes, said lever being mounted to turn and to move in a vertical plane, the shorter member of the lever being adapted to be engaged by the curved portion of the striking member to move the said lever so as to permit the shorter member to engage the said curved portion to lock the trap set, and a pivoted member having two portions with one of which the longer member of the slipping lever engages and under the other the bait is adapted to be placed.

In testimony whereof I have signed my name to this specification.

JACOBUS PIET HENRI KROON.